United States Patent
Katsuumi et al.

(10) Patent No.: US 10,050,403 B2
(45) Date of Patent: Aug. 14, 2018

(54) EXCIMER LASER CHAMBER DEVICE

(71) Applicant: Gigaphoton Inc., Tochigi (JP)

(72) Inventors: Hisakazu Katsuumi, Oyama (JP); Kazuya Takezawa, Oyama (JP); Kouji Kakizaki, Oyama (JP); Hiroaki Tsushima, Oyama (JP); Takeshi Asayama, Oyama (JP)

(73) Assignee: Gigaphoton Inc., Tochigi (JP)

( * ) Notice: Subject to any disclaimer, the term of this patent is extended or adjusted under 35 U.S.C. 154(b) by 0 days.

(21) Appl. No.: 15/680,474

(22) Filed: Aug. 18, 2017

(65) Prior Publication Data

US 2017/0346252 A1 Nov. 30, 2017

Related U.S. Application Data

(63) Continuation of application No. PCT/JP2016/055137, filed on Feb. 23, 2016.

(30) Foreign Application Priority Data

Mar. 11, 2015 (WO) .................. PCT/JP2015/057214

(51) Int. Cl.
*H01S 3/038* (2006.01)
*H01S 3/225* (2006.01)
(Continued)

(52) U.S. Cl.
CPC .............. *H01S 3/038* (2013.01); *H01S 3/036* (2013.01); *H01S 3/0906* (2013.01); *H01S 3/0977* (2013.01); *H01S 3/225* (2013.01)

(58) Field of Classification Search
CPC ........ H01S 3/038; H01S 3/036; H01S 3/0906; H01S 3/225; H01S 3/0977
See application file for complete search history.

(56) References Cited

U.S. PATENT DOCUMENTS 5,686,789 A * 11/1997 Schoenbach ............ H01J 1/025
  313/491
7,068,697 B1 * 6/2006 Amada ................... H01S 3/036
  372/55

(Continued)

FOREIGN PATENT DOCUMENTS

JP   S63-229789 A   9/1988
JP   H06-029592 A   2/1994
(Continued)

OTHER PUBLICATIONS

International Search Report issued in PCT/JP2016/055137; dated May 24, 2016.

*Primary Examiner* — Xinning Niu
(74) *Attorney, Agent, or Firm* — Studebaker & Brackett PC

(57) ABSTRACT

An excimer laser chamber device may include: a the laser chamber; a first electrode provided in the laser chamber; a second electrode provided in the laser chamber to face the first electrode; an electrode holder provided in the laser chamber to be connected to a high voltage; at least one connecting terminal including a first anchored portion anchored to the first electrode and a second anchored portion anchored to the electrode holder, the at least one connecting terminal being configured to electrically connect the first electrode and the electrode holder; a guide member held by the electrode holder, the guide member being configured to position the first electrode in a direction substantially perpendicular to both a direction of electric discharge between the first electrode and the second electrode and a longitudinal direction of the first electrode; and an electrode-gap-varying unit configured to move the first electrode in a direction substantially parallel to the direction of electric discharge.

20 Claims, 17 Drawing Sheets

(51) Int. Cl.
*H01S 3/0977* (2006.01)
*H01S 3/036* (2006.01)
*H01S 3/09* (2006.01)

(56) References Cited

U.S. PATENT DOCUMENTS

| | | | |
|---|---|---|---|
| 7,856,044 B2 | 12/2010 | Sandstrom et al. | |
| 2007/0253459 A1* | 11/2007 | Sandstrom | H01S 3/038 372/87 |
| 2014/0023101 A1 | 1/2014 | Wang et al. | |
| 2015/0194781 A1 | 7/2015 | Asayama et al. | |

FOREIGN PATENT DOCUMENTS

| | | |
|---|---|---|
| JP | 2001-298229 A | 10/2001 |
| JP | 2006-229136 A | 8/2006 |
| JP | 2014-511036 A | 5/2014 |
| WO | 2014/046186 A1 | 3/2014 |

\* cited by examiner

# EXCIMER LASER CHAMBER DEVICE

TECHNICAL FIELD

The present disclosure relates to an excimer laser chamber device.

BACKGROUND ART

The recent miniaturization and integration of semiconductor integrated circuits have led to a demand for increasing resolutions of semiconductor exposure apparatuses (hereinafter referred to as "exposure apparatuses"). Accordingly, advances are being made to reduce wavelengths of light emitted from exposure light sources. Typically used as exposure light sources are gas laser apparatuses instead of conventional mercury lamps. A gas laser apparatus used as an exposure light source may include, for example, a KrF excimer laser apparatus that outputs an ultraviolet laser beam at a wavelength of 248 nm and an ArF excimer laser apparatus that outputs an ultraviolet laser beam at a wavelength of 193 nm.

Patent Document 1
Japanese Patent Application Publication No. H06-029592 A
Patent Document 2
U.S. Pat. No. 7,856,044 B
Patent Document 3
Japanese Patent Application Publication No. S63-229789 A
Patent Document 4
International Publication No. WO 2014/046186 A
Patent Document 5
Japanese Patent Application Publication No. 2006-229136 A
Patent Document 6
Japanese Patent Application Publication No. 2001-298229 A

SUMMARY

An excimer laser chamber device according to an aspect of the present disclosure may include a laser chamber; a first electrode provided in the laser chamber; a second electrode provided in the laser chamber to face the first electrode; an electrode holder provided in the laser chamber to be connected to a high voltage; at least one connecting terminal each including a first anchored portion anchored to the first electrode and a second anchored portion anchored to the electrode holder, the at least one connecting terminal being configured to electrically connect the first electrode and the electrode holder; a guide member held by the electrode holder, the guide member being configured to position the first electrode in a direction substantially perpendicular to both a direction of electric discharge between the first electrode and the second electrode and a longitudinal direction of the first electrode; and an electrode-gap-varying unit configured to move the first electrode in a direction substantially parallel to the direction of electric discharge.

BRIEF DESCRIPTION OF DRAWINGS

Exemplary embodiments of the present disclosure will be described below with reference to the appended drawings.

DESCRIPTION OF EMBODIMENTS

Figure 1:
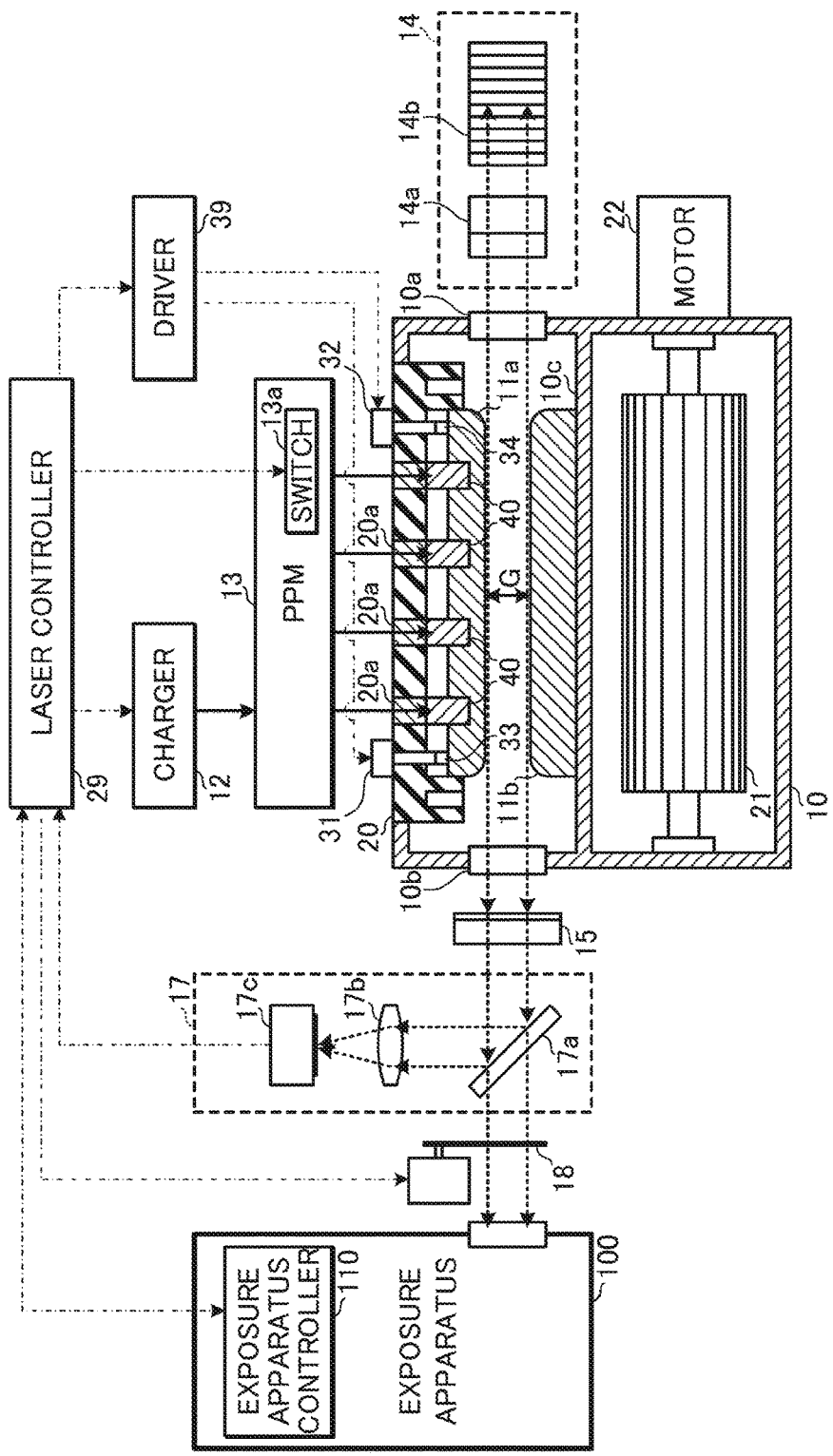
FIG. 1 schematically shows a configuration of an excimer laser device according to a first embodiment.

Contents
1. Outline
2. General Configuration of Excimer Laser Device
   2.1 Laser Chamber
   2.2 Optical Resonator
   2.3 Laser Controller
   2.4 Various Sensors
   2.5 Wearing of Electrode
3. Electrode Holding Structure for Excimer Laser Device
   3.1 Comparative Example
   3.2 Problems
   3.3 Electrode Holding Structure Including Connecting Terminals and Guide Members
   3.4 Electrode-Gap-Varying Unit (First Example)
   3.5 Electrode-Gap-Varying Unit (Second Example)
4. Electrode Holding Structure with Function of Easing Electric Field
   4.1 Guide Member
   4.2 Electrically Insulating Member
   4.3 Connecting Terminals
   4.4 Connecting Terminals (First Modified Example)
   4.5 Connecting Terminals (Second Modified Example)
5. Electrode Holding Structure Where Function of Easing Electric Field is Omitted
6. Electrode Holding Structure Having Long Connecting Terminals
7. Electrode Holding Structure with Connecting Terminals Attached to Upper Surface of Electrode
8. Electrode with Function of Easing Electric Field
9. Electrode Holding Structure with Integrated Connecting Terminal
10. Others (Configuration of Pulse Power Module)

Embodiments of the present disclosure will be described below in detail with reference to the drawings. The embodiments described below may represent several examples of the present disclosure and may not intend to limit the content of the present disclosure. Not all of the configurations and operations described in the embodiments are indispensable in the present disclosure. Identical reference symbols may be assigned to identical elements and redundant descriptions may be omitted.

1. Outline

An excimer laser device for an exposure apparatus may include a pair of electrodes provided in a laser chamber. The laser chamber may contain and seal a laser gas. The excimer laser device may apply a high voltage to generate electric discharge between the pair of electrodes to excite the laser gas, thus causing laser oscillation.

Repetition of the electric discharge in the excimer laser device may cause a surface of the pair of electrodes to wear and cause a gap distance between the pair of electrodes to increase. Increase in the gap distance between the pair of electrodes may result in change in discharging behavior and result in deterioration in stability of laser beam generation.

International Publication No. WO 2014/046186 relates to a laser device that moves a first electrode toward a second electrode in a certain distance if the pair of electrodes has worn due to discharge operation. In the laser device, the first electrode and a plate spring are inserted in a fork-shaped connector having branch portions. Friction between the plate spring and the first electrode may support the first electrode and may provide electrical connection between the fork-shaped connector and the first electrode. The first electrode may be slidably movable at the certain distance toward the second electrode by an electrode-gap-varying unit that overcomes the friction.

However, the surfaces of the first electrode and the plate spring may react with a halogen gas in the laser chamber and may change in their properties. There may be a problem where an electrical contact resistance between the first electrode and the plate spring may increase and their contact surfaces may melt due to Joule heat.

According to an aspect of the present disclosure, the laser chamber may accommodate an electrode holder connected to a high voltage, and the first electrode and the electrode holder are electrically connected by a connecting terminal. Further, a guide member held by the electrode holder may define the position of the first electrode in a direction substantially perpendicular to both a direction of electric discharge and a longitudinal direction of the first electrode. This may allow a function of positioning the first electrode to the electrode holder and a function of electrical connection between the first electrode and the electrode holder to be allocated to the respective parts that may improve reliability of the respective functions.

2. General Configuration of Excimer Laser Device

FIG. 1 schematically shows a configuration of an excimer laser device according to a first embodiment. The excimer laser device shown in FIG. 1 may include a laser chamber 10, a pair of electrodes 11a and 11b, a charger 12, and a pulse power module (PPM) 13. FIG. 1 shows an internal configuration of the laser chamber 10 as viewed in a direction substantially perpendicular to both a direction of electric discharge between the pair of electrodes 11a and 11b and a direction of travel of the pulsed laser beam. The direction of electric discharge between the pair of electrodes 11a and 11b may be substantially parallel to the direction of gravity. The direction of travel of the pulsed laser beam may substantially coincide with the longitudinal direction of the electrode 11a and that of the electrode 11b.

The excimer laser device may further include a cross flow fan 21 and a motor 22. The excimer laser device may still further include a line narrow module 14, an output coupling mirror 15, a pulse energy measuring unit 17, a shutter 18, and a laser controller 29. The excimer laser device shown in FIG. 1 may be connected to an exposure apparatus 100 that performs exposure using the laser beam outputted from the excimer laser device.

2.1 Laser Chamber

The laser chamber 10 may be a chamber that stores a laser gas serving as a laser medium, which includes, for example, a rare gas such as argon gas, krypton gas or xenon gas, a halogen gas such as fluorine gas or chlorine gas, and a buffer gas such as neon gas or helium gas. The pair of electrodes 11a and 11b may be disposed within the laser chamber 10 as electrodes for exciting the laser medium by electric discharge. The pair of electrodes 11a and 11b may be made of copper. The pair of electrodes 11a and 11b may preferably be made of oxygen-free copper, which has low reactivity with the fluorine gas and high electrical conductivity.

The laser chamber 10 may have an opening sealed by an electrical insulator 20. The electrode 11a may be supported by the electrical insulator 20 and the electrode 11b may be supported by a return plate 10c of the laser chamber 10. In the electrical insulator 20, a plurality of conductive elements 20a may be molded. The conductive elements 20a may apply high voltage supplied by the pulse power module 13 to the electrode 11a.

The cross flow fan 21 may have an axis of rotation that is connected to the motor 22 provided outside the laser chamber 10. The motor 22 may rotate the cross flow fan 21 to circulate the laser gas in the laser chamber 10.

The charger 12 and the pulse power module 13 may constitute a power source unit. The pulse power module 13 may include a charging capacitor described later with reference to FIG. 17 and a switch 13a. An output of the charger 12 may be connected to the charging capacitor. The charging capacitor may store electric energy for applying the high voltage to the pair of electrodes 11a and 11b. The switch 13a may be controlled by the laser controller 29. When the switch 13a turns ON, the pulse power module 13 may generate a pulsed high voltage using the electric energy stored in the charger 12. The pulsed high voltage may be applied to the pair of electrodes 11a and 11b.

The high voltage applied to the pair of electrodes 11a and lib may cause electric discharge between the pair of electrodes 11a and 11b. The laser medium in the laser chamber 10 may be excited by the energy of the electric discharge and may shift to a high energy level. The excited laser medium may then shift back to a low energy level to emit light having a certain wavelength depending on the difference between the energy levels.

The laser chamber 10 may have windows 10a and 10b at respective ends of the laser chamber 10. The light generated in the laser chamber 10 may be emitted from the laser chamber 10 through the windows 10a and 10b.

2.2 Optical Resonator

The line narrow module 14 may include a prism 14a and a grating 14b. The prism 14a may expand beam width of the light emitted through the window 10a of the laser chamber 10 and may allow the light to fall on the grating 14b. Further, the prism 14a may reduce beam width of reflected light from the grating 14b and may transmit the light toward the laser chamber 10.

The grating 14b may be made of a high-reflective material and may have a large number of grooves formed at predetermined intervals on a surface of the grating 14b. Each of the grooves may, for example, be a triangular groove. The light having fallen on the grating 14b from the prism 14a may be reflected by the surface of the grating 14b, while being diffracted at angles of diffraction according to wavelengths of the light. The light having a wavelength around a specific wavelength may return to the laser chamber 10 via the prism 14a. Namely, the grating 14b may be in a Littrow arrangement so that an angle of incidence of the light falling on the grating 14b and an angle of diffraction of the diffracted light having the wavelength around the specific wavelength are substantially equal to each other.

In this manner, the line narrow module 14 for reducing the spectral width of the laser beam may be constituted by the prism 14a and the grating 14b. Alternatively, the line narrow module 14 may be substituted by a high-reflective mirror (not shown) such that most of the wavelength components of the light emitted from the window 10a return to the laser chamber 10.

The output coupling mirror 15 may have a surface coated with a partially-reflective film. The output coupling mirror 15 may thus transmit and output a part of the light outputted through the window 10b of the laser chamber 10 and may reflect another part of the light back into the laser chamber 10.

The line narrow module 14 and the output coupling mirror 15 may thus constitute an optical resonator. The light emitted from the laser chamber 10 may travel back and forth between the line narrow module 14 and the output coupling mirror 15 and may be amplified each time it passes through a laser gain space between the electrodes 11a and 11b. A part of the light thus amplified may be outputted via the output coupling mirror 15 as the pulsed laser beam.

2.3 Laser Controller

The laser controller 29 may send and receive various signals to and from an exposure apparatus controller 110 in the exposure apparatus 100. The laser controller 29 may receive data on target pulse energy, a signal to start outputting the pulsed laser beam, and the like, each from the exposure apparatus controller 110. Further, the laser controller 29 may send a charging-voltage setting signal to the charger 12 and a switch ON/OFF signal to the pulse power module 13.

2.4 Various Sensors

The pulse energy measuring unit 17 may include a beam splitter 17a, focusing optics 17b, and an optical sensor 17c. The beam splitter 17a may transmit a part of the laser beam, emitted from the output coupling mirror 15, at a high transmittance to the exposure apparatus 100. The beam splitter 17a may reflect another part of the laser beam to the focusing optics 17b. The focusing optics 17b may concentrate the light reflected by the beam splitter 17a on a photosensitive surface of the optical sensor 17c. The optical sensor 17c may detect pulse energy of the laser beam concentrated on the photosensitive surface and output data on the pulse energy to the laser controller 29.

The laser controller 29 may receive the data on the pulse energy from the pulse energy measuring unit 17 and control the charging voltage of the charger 12 based on the data on the pulse energy. Controlling the charging voltage of the charger 12 may result in controlling the pulse energy of the laser beam. Further, the laser controller 29 may count the number of times of receiving the data on the pulse energy from the pulse energy measuring unit 17. The laser controller 29 may store the number in a memory (not shown) as the number of times of electric discharge between the pair of electrodes 11a and 11b.

The shutter 18 may be provided in the optical path of the pulsed laser beam transmitted by the beam splitter 17a of the pulse energy measuring unit 17.

The laser controller 29 may control the shutter 18 to be closed, from starting laser oscillation, until difference between the pulse energy received from the pulse energy measuring unit 17 and the target pulse energy falls within an acceptable range. The laser controller 29 may control the shutter 18 to be opened, if the difference between the pulse energy received from the pulse energy measuring unit 17 and the target pulse energy falls within the acceptable range.

2.5 Wearing of Electrode

The high voltage applied to the pair of electrodes 11a and 11b may cause electric discharge between the pair of electrodes 11a and 11b. Repetition of the electric discharge may cause the pair of electrodes 11a and 11b to wear and the gap distance G (see FIG. 1) between the electrodes to increase. Increase in the gap distance G may result in change in discharging behavior and result in deterioration in stability of laser beam generation. For example, the beam size or the beam divergence of the laser beam may change. Further, stability of pulse energy of the outputted pulsed laser beam or efficiency of laser oscillation may be deteriorated.

Accordingly, the laser controller 29 may estimate a wearing amount of the pair of electrodes 11a and 11b based on the number of times of electric discharge. If the wearing amount of the electrodes reaches a predetermined value, electrode-gap-varying units 31 and 32 described later may move the electrode 11a toward the electrode 11b. A lifetime of the electrodes may thus be extended and laser performance may be stabilized.

3. Electrode Holding Structure for Excimer Laser Device

3.1 Comparative Example

Figure 2:
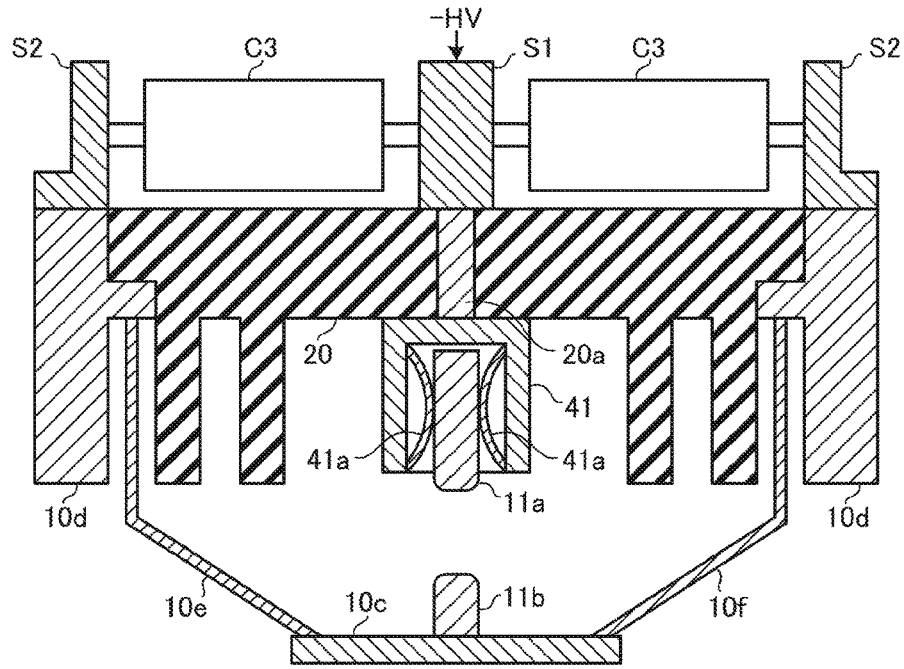
FIG. 2 shows a part of a configuration of an excimer laser device according to a comparative example.

FIG. 2 shows a configuration of a part of an excimer laser device according to a comparative example. FIG. 2 shows the configuration of a part of an excimer laser device as viewed in a direction substantially parallel to a direction of travel of the pulsed laser beam. A configuration as viewed in a direction substantially perpendicular to both the direction of electric discharge between the pair of electrodes 11a and 11b and the direction of travel of the pulsed laser beam may be substantially the same as that of the first embodiment described with reference to FIG. 1. Accordingly, description for the excimer laser device of the comparative example may be made with reference to FIG. 1.

The laser chamber 10 of the comparative example may contain the pair of electrodes 11a and 11b and the return plate 10c, and further contain wirings 10e and 10f, a fork-shaped connector 41, and a plurality of leaf springs 41a.

A capacitor C3 and connecting members S1 and S2 may be provided outside the laser chamber 10. The connecting member S1 may be connected to a high voltage supplied by the pulse power module 13. The connecting member S2 may be connected to the ground potential. The capacitor C3 may be electrically connected between the connecting members S1 and S2. The capacitor C3 may constitute a part of the pulse power module 13. Details of the pulse power module 13 including the capacitor C3 are described later.

A conducting member 10d may constitute a part of a wall of the laser chamber 10 and may be electrically connected to the connecting member S2. The electrode 11b may be connected, via the return plate 10c, the wirings 10e and 10f, and the conducting member 10d, to the ground potential.

One of the conductive elements 20a may be electrically connected to the connecting member S1. The electrode 11a may be connected, via the leaf springs 41a, the fork-shaped connector 41, and the conductive element 20a, to the high voltage supplied by the pulse power module 13.

The fork-shaped connector 41 may have branch portions and a base portion. The base portion may be connected to the conductive element 20a. A part of the electrode 11a may be inserted between the branch portions of the fork-shaped connector 41. Another part of the electrode 11a may protrude opposite to the base portion from between the branch portions. The electrode 11b may be arranged to face the protruding part of the electrode 11a.

Clearances may exist between the branch portions of the fork-shaped connector 41 and respective side surfaces of the electrode 11a. In the present disclosure, side surfaces of an electrode may represent surfaces at both ends of the electrode in a direction perpendicular to both a direction of electric discharge between the pair of electrodes 11a and 11b and a direction of travel of the pulsed laser beam.

Each of the clearances between the branch portions of the fork-shaped connector 41 and the respective side surfaces of the electrode 11a may accommodate a leaf spring 41a at a compressed state. This configuration may allow the electrode 11a to be held by the leaf springs 41a between the branch portions of the fork-shaped connector 41. This configuration may thus restrict movement of the electrode 11a in a direction perpendicular to both the direction of electric discharge between the pair of electrodes 11a and 11b and a longitudinal direction of the electrode 11a. This configuration may also allow the electrode 11a to be electrically connected via the leaf springs 41a to the fork-shaped connector 41.

The electrode 11a may be slidably movable relatively to the leaf springs 41a, without being anchored to the leaf springs 41a, in a direction substantially parallel to the direction of electric discharge between the pair of electrodes 11a and 11b.

As shown in FIG. 1, the excimer laser device may further include electrode-gap-varying units 31 and 32, insulating portions 33 and 34, and a driver 39. The electrode-gap-varying units 31 and 32 may be anchored to the electrical insulator 20. The electrode-gap-varying units 31 and 32 may allow the electrode 11a to move toward the electrode 11b.

By the electrode-gap-varying units 31 and 32, the electrode 11a may be slidably moved relatively to the leaf springs 41a, keeping contact with the leaf springs 41a.

3.2 Problem

The surfaces of the electrode 11a and the surface of the leaf springs 41a may react with the halogen gas in the laser chamber and may change in their properties. This may cause a problem, in the comparative example described with reference to FIG. 2, where an electrical contact resistance between the electrode 11a and the leaf springs 41a may increase and their contact surfaces may melt due to Joule heat.

The present disclosure may achieve, with the following configuration, both movably supporting the electrode 11a and electrically connecting the electrode 11a and the conductive elements 20a.

Figure 3:
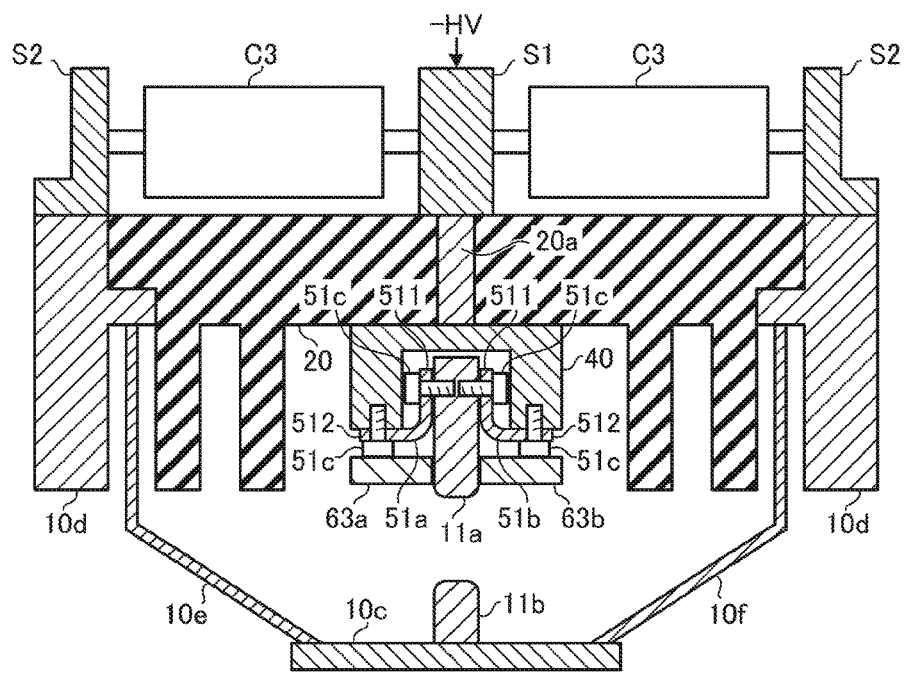
FIG. 3 shows a part of a configuration of the excimer laser device according to the first embodiment.

3.3 Electrode Holding Structure Including Connecting Terminal and Guide Member FIG. 3 shows a configuration of a part of the excimer laser device according to the first embodiment. FIG. 3 shows a part of the excimer laser device as viewed in a direction substantially parallel to the direction of travel of the pulsed laser beam.

As shown in FIG. 3, the excimer laser device of the first embodiment may include, as an electrode holding structure, an electrode holder 40, a plurality of connecting terminals 51a and 51b, and a plurality of guide members 63a and 63b. The fork-shaped connector 41 and the leaf springs 41a in the comparative example described with reference to FIG. 2 may be unnecessary.

The electrode holder 40 may have branch portions and a base portion. The base portion may be connected to the conductive element 20a. The electrode holder 40 may be made of copper. The electrode holder 40 may preferably be made of oxygen-free copper, which has low reactivity with the fluorine gas and high electrical conductivity. A part of the electrode 11a may be inserted between the branch portions of the electrode holder 40. Another part of the electrode 11a may protrude opposite to the base portion from between the branch portions. The electrode 11b may be arranged to face the protruding part of the electrode 11a.

The connecting terminals 51a and 51b may be anchored to the respective side surfaces of the electrode 11a. Each of the connecting terminals 51a and 51b may be an elastic leaf spring. Each of the connecting terminals 51a and 51b may be a thin plate made of copper or nickel. If the halogen gas is fluorine gas, the connecting terminals 51a and 51b may preferably be made of oxygen-free copper, which has low reactivity with the fluorine gas and high electrical conductivity. Each of the connecting terminals 51a and 51b may have a thickness of 0.03 mm or more and 0.08 mm or less, preferably around 0.05 mm. Alternatively, if the halogen gas is chlorine gas, the connecting terminals 51a and 51b may be made of metal nickel, which has low reactivity with the chlorine gas, or metal copper plated with nickel.

Each of the connecting terminals 51a and 51b may have a first anchored portion 511 and a second anchored portion 512. Each of the connecting terminals 51a and 51b may be bent at a portion between the first anchored portion 511 and the second anchored portion 512. The first anchored portion 511 may be anchored to a corresponding side surface of the electrode 11a with a surface contact. The second anchored portion 512 may be anchored to a bottom surface of the electrode holder 40 with a surface contact. Anchoring the connecting terminals 51a and 51b to the electrode 11a and anchoring the connecting terminals 51a and 51b to the electrode holder 40 may each be done by a bolt 51c.

The guide members 63a and 63b may each have electrical conductivity. The guide members 63a and 63b may be made of copper or nickel. If the halogen gas is fluorine gas, the guide members 63a and 63b may be made of oxygen-free copper, which has low reactivity with the fluorine gas and high electrical conductivity. Alternatively, if the halogen gas is chlorine gas, the guide members 63a and 63b may preferably be made of metal nickel, or metal copper plated with nickel. The guide members 63a and 63b may be arranged with a gap between them. The gap may be almost equal to a thickness of the electrode 11a. A part of the electrode 11a may be inserted between the guide members 63a and 63b. The electrode 11a may be movable in between the guide members 63a and 63b, keeping contact with the guide members 63a and 63b. Another part of the electrode 11a may protrude opposite to the base portion from between the guide members 63a and 63b.

In other aspects, the first embodiment may be substantially the same as the comparative example described with reference to FIG. 2.

According to the first embodiment, the first anchored portion 511 of each of the connecting terminals 51a and 51b may be anchored to the electrode 11a and the second anchored portion 512 of each of the connecting terminals 51a and 51b may be anchored to the electrode holder 40. The electrode 11a may be moved in a direction substantially parallel to the direction of electric discharge between the electrodes 11a and 11b. In this case, the connecting terminals 51a and 51b may be deformed while being kept anchored to the electrode 11a and to the electrode holder 40. According to this, electric connections between the electrode 11a and the electrode holder 40 may be secured. Deforming of the connecting terminals 51a and 51b are to be explained in detail in the second embodiment.

Further, the first embodiment may have a configuration where the electrode 11a is sandwiched between the guide members 63a and 63b. Moving the electrode 11a may thus be suppressed in a direction perpendicular to both the direction of electric discharge between the pair of electrodes 11a and 11b and the longitudinal direction of the electrode 11a. Accuracy in positioning of the electrode 11a may thus be improved.

3.4 Electrode-Gap-Varying Unit (First Example)

Figure 4:
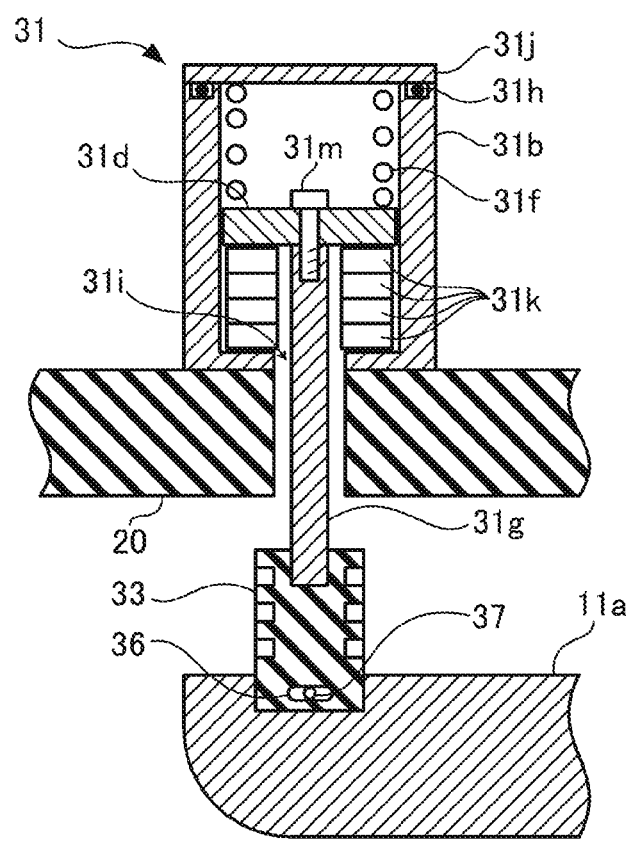
FIG. 4 shows a specific configuration of an electrode-gap-varying unit 31 and an insulating portion 33 shown in FIG. 1.

FIG. 4 shows a specific configuration of the electrode-gap-varying unit 31 and an insulating portion 33 shown in FIG. 1. The electrode-gap-varying unit 32 and the insulating portion 34 shown in FIG. 1 are not shown in FIG. 4; however, they are substantially the same as the electrode-gap-varying unit 31 and the insulating portion 33, respectively. The electrode-gap-varying unit 31 may include a cylinder 31b, a piston 31d, a spring 31f, a shaft 31g, and a cover 31j.

The cylinder 31b may be fixed to the electrical insulator 20. The cover 31j may be put on the cylinder 31b. An O-ring 31h may be provided between contact surfaces of the cylinder 31b and the cover 31j to keep airtight between the contact surfaces of the cylinder 31b and the cover 31j.

The piston 31d may be movably disposed in the cylinder 31b. A first end of the shaft 31g may be anchored in the cylinder 31b to the piston 31d by a bolt 31m. The shaft 31g may extend through an opening 31i of the cylinder 31b and a through hole of the electrical insulator 20, being movable along the through hole of the electrical insulator 20. A second end of the shaft 31g may be positioned opposite to the cylinder 31b across the electrical insulator 20. The second end of the shaft 31g may be anchored to the insulating portion 33. A slot 36 may be formed in the insulating portion 33. An end of a pin 37 may be anchored to the electrode 11a and the other end of the pin 37 may be located in the slot 36. The pin 37 may be movable along the longitudinal direction of the slot 36. The longitudinal direction of the slot 36 may substantially coincide with the longitudinal direction of the electrode 11a. The electrode-gap-varying unit 31 and the insulating portion 33 may thus support the electrode 11a. Further, even when the electrode 11a expands with heat in the longitudinal direction of the electrode 11a, for example, the pin 37 may move along the longitudinal direction of the slot 36 without breaking the electrode-gap-varying unit 31 or the insulating portion 33. The electrical insulator 20 may be constituted by alumina-based ceramic.

A plurality of shims 31k may be provided, each shim 31k surrounding the shaft 31g in the cylinder 31b.

The spring 31f may be provided in the cylinder 31b between the piston 31d and the cover 31j. The spring 31f may apply resilient force to the piston 31d in a direction toward the electrical insulator 20.

When one or more of the shims 31k are removed, the piston 31d may move downward in FIG. 4. Specifically, after opening the cover 31j, removing the spring 31f, removing the bolt 31m, and then removing the piston 31d from the shaft 31g, the one or more of the shims 31k may be removed.

The electrode-gap-varying unit 31 may thus move the electrode 11a downward in FIG. 4, in other words, in a direction parallel to the direction of electric discharge.

3.5 Electrode-Gap-Varying Unit (Second Example)

Figure 5:
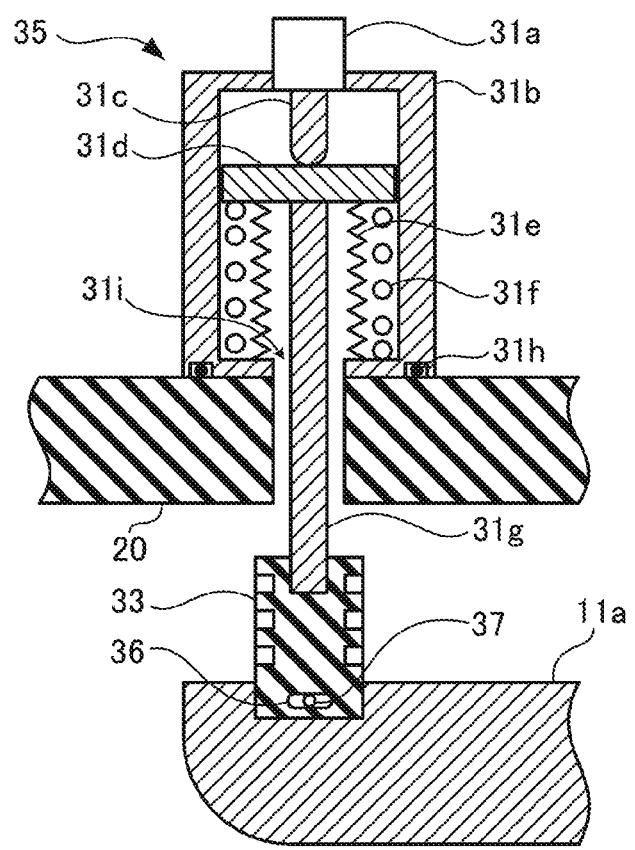
FIG. 5 shows a specific configuration of an electrode-gap-varying unit 35 and an insulating portion 33 according to a modified example.

FIG. 5 shows a specific configuration of an electrode-gap-varying unit 35 and an insulating portion 33 according to a modified example. An electrode-gap-varying unit 35 shown in FIG. 5 may be used instead of the electrode-gap-varying unit 31 or 32.

The electrode-gap-varying unit 35 may include a micrometer head 31a, a cylinder 31b, a spindle 31c, a piston 31d, a flexible tube 31e, a spring 31f, and a shaft 31g.

The cylinder 31b may be fixed to the electrical insulator 20. An O-ring 31h may be provided between contact surfaces of the cylinder 31b and the electrical insulator 20 to keep airtight between the contact surfaces of the cylinder 31b and the electrical insulator 20.

The piston 31d may be movably disposed in the cylinder 31b. A first end of the shaft 31g may be anchored in the cylinder 31b to the piston 31d. The shaft 31g may extend through an opening 31i of the cylinder 31b and a through hole of the electrical insulator 20, being movable along the through hole of the electrical insulator 20. A second end of the shaft 31g may be positioned opposite to the cylinder 31b across the electrical insulator 20. The second end of the shaft 31g may be anchored to the insulating portion 33. A slot 36 may be formed in the insulating portion 33. An end of a pin 37 may be anchored to the electrode 11a and the other end of the pin 37 may be located in the slot 36. The pin 37 may be movable along the longitudinal direction of the slot 36.

The shaft 31g may extend through the flexible tube 31e disposed in the cylinder 31b. A first end of the flexible tube 31e may be sealed to the piston 31d. A second end of the flexible tube 31e may be sealed to a periphery of the opening 31i of the cylinder 31b. The through hole of the electrical insulator 20 may thus be sealed airtight by using the flexible tube 31e and the piston 31d.

The spring 31f provided in the cylinder 31b may surround the flexible tube 31e. The spring 31f may apply resilient force to the piston 31d in a direction away from the electrical insulator 20.

The micrometer head 31a may be fixed to the cylinder 31b. The micrometer head 31a may be driven by the driver 39 shown in FIG. 1. The driver 39 may be controlled by the laser controller 29 shown in FIG. 1. The micrometer head 31a may thus move the spindle 31c located in the cylinder 31b toward the electrical insulator 20. The spindle 31c may push the piston 31d against the resilient force of the spring 31f.

The electrode-gap-varying unit 35 may thus move the electrode 11a downward in FIG. 5, in other words, in a direction parallel to the direction of electric discharge.

4. Electrode Holding Structure with Function of Easing Electric Field

Figure 6A:
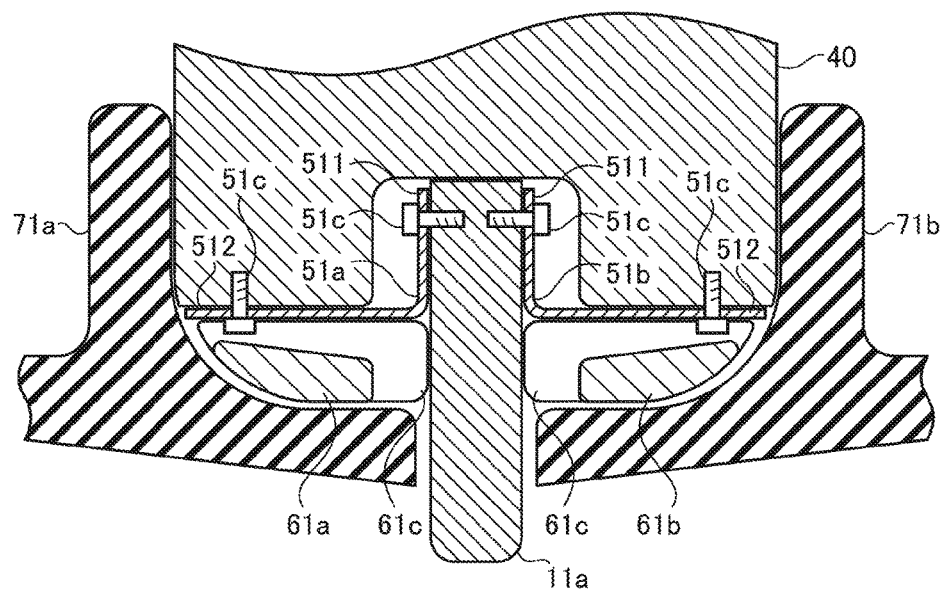
FIG. 6A is a cross-sectional view showing an electrode holding structure in an excimer laser device according to a second embodiment.
Figure 6B:
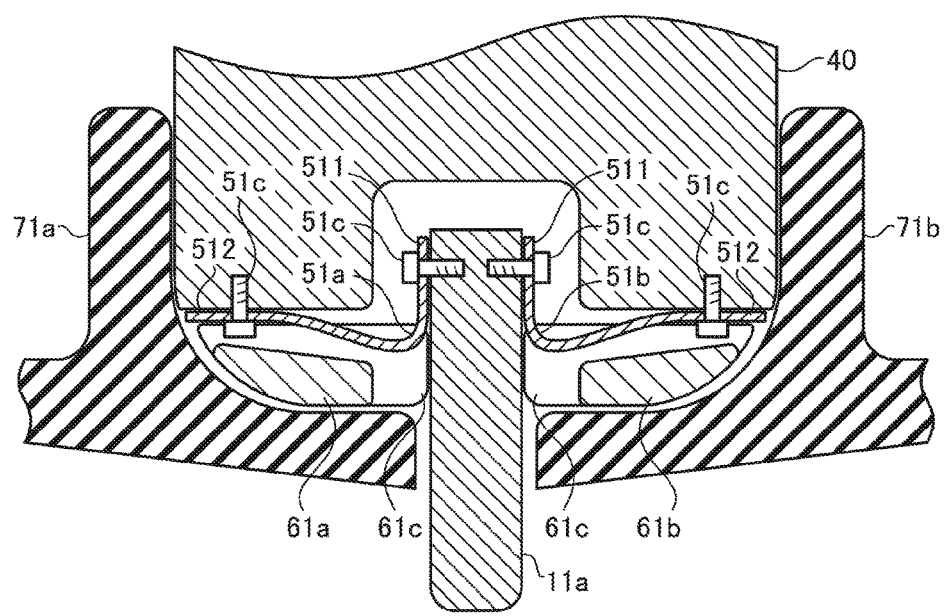
FIG. 6B is another cross-sectional view showing the electrode holding structure in the excimer laser device according to the second embodiment.

FIGS. 6A and 6B are cross-sectional views of an electrode holding structure of the excimer laser device according to the second embodiment. FIG. 6A shows a situation before the electrode 11a is moved by the electrode-gap-varying unit. FIG. 6B shows a situation after the electrode 11a is slightly moved by the electrode-gap-varying unit. As shown in FIGS. 6A and 6B, moving the electrode 11a by the electrode-gap-varying units may cause the connecting terminals 51a and 51b to deform. FIG. 6A shows, for a concise explanation, a situation where the connecting terminals 51a and 51b have not deformed. However, another situation may be possible where the connecting terminals 51a and 51b have deformed. Such deformation may occur when the first anchored portion 511 of each of the connecting terminals 51a and 51b is pulled down by the gravity force on the electrode 11a. In other words, the connecting terminals 51a and 51b may flexibly support the electrode 11a against the gravity force.

An electrode holding structure in the second embodiment may include the electrode holder 40, the connecting terminals 51a and 51b, and the guide members 61a and 61b, and further include a plurality of electrically insulating members 71a and 71b.

Configurations of the electrode holder 40 and the connecting terminals 51a and 51b may be substantially the same as those of the first embodiment described with reference to FIG. 3.

4.1 Guide Member

Each of the guide members 61a and 61b of the second embodiment may have projecting portions 61c. In FIGS. 6A and 6B, sections of the guide members 61a and 61b are marked by hatching. However, the projecting portions 61c are not marked by hatching since they are distanced from the sections in the depth direction of each figure.

Figure 7A:
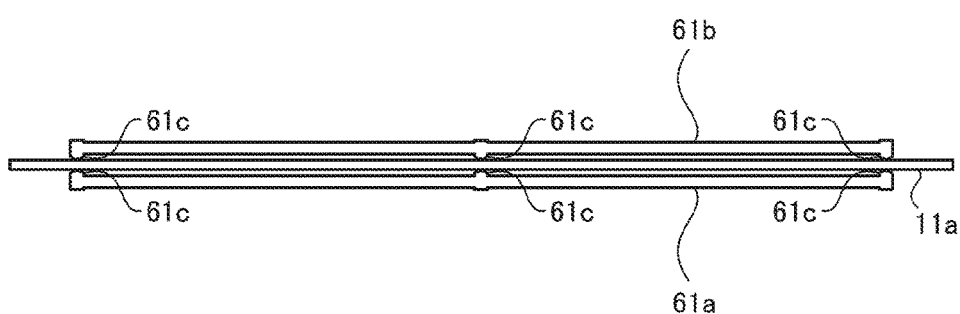
FIG. 7A shows an entire configuration of a plurality of guide members 61a and 61b and an entire configuration of an electrode 11a, while the other configurations have been removed, in the second embodiment.
Figure 7B:
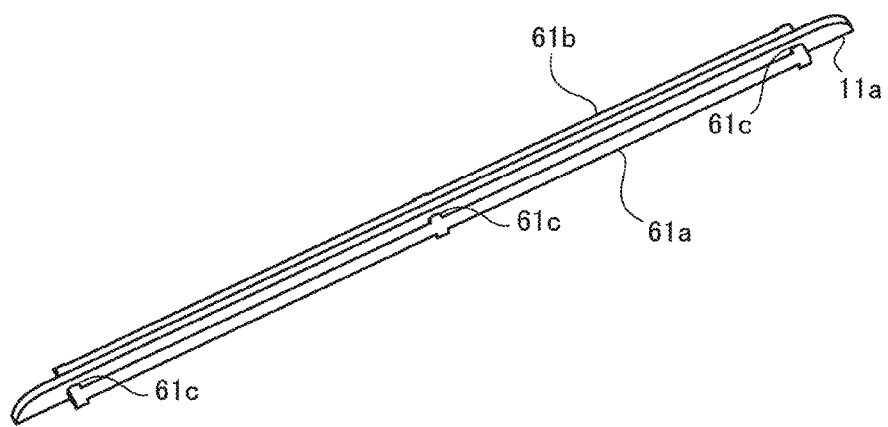
FIG. 7B also shows the entire configuration of the guide members 61a and 61b and the entire configuration of the electrode 11a, while the other configurations have been removed, in the second embodiment.

FIGS. 7A and 7B show an entire configuration of the plurality of guide members 61a and 61b and an entire configuration of the electrode 11a, while the other configurations have been removed, in the second embodiment. FIG. 7A is a view in a direction substantially parallel to the direction of electric discharge between the pair of electrodes. FIG. 7B is a perspective view from a position lower than the guide members 61a and 61b.

The guide member 61a may have three projecting portions 61c and the guide member 61b may have three other projecting portions 61c. The three projecting portions 61c in the guide member 61a may face the respective three projecting portions 61c in the guide member 61b. The electrode 11a may thus be sandwiched between the projecting portions 61c at respective locations in the longitudinal direction of the electrode 11a. Also, the projecting portions 61c may each be in contact with the corresponding side surface of the electrode 11a. The electrode 11a may be movable in a direction substantially parallel to the direction of electric discharge while keeping contact with the projecting portions 61c.

Lower surfaces of the guide members 61a and 61b may be smoothly curved surfaces. In a case where the guide members 63a and 63b have rectangular sections as in the first embodiment described with reference to FIG. 3, electric field may be locally intensified around the ridges of the guide members 63a and 63b. This may cause electric discharge in unintended spaces other than between the electrodes 11a and 11b. In the second embodiment, lower surfaces of the guide members 61a and 61b may be smoothly curved surfaces. The smoothly curved surfaces may ease electric field in a space other than the discharge space between the electrodes 11a and 11b to suppress electric discharge in unintended spaces.

4.2 Electrically Insulating Member

Figure 8A:
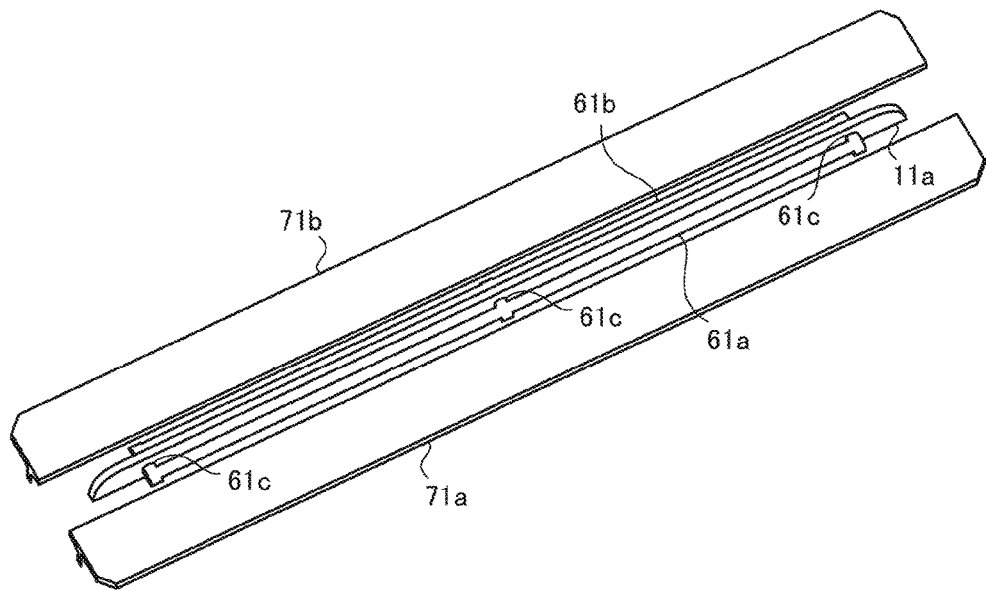
FIG. 8A is a perspective view from a lower position of an entire configuration of electrically insulating members 71a and 71b, an entire configuration of the guide members 61a and 61b and an entire configuration of the electrode 11a, while the other configurations have been removed, in the second embodiment.
Figure 8B:
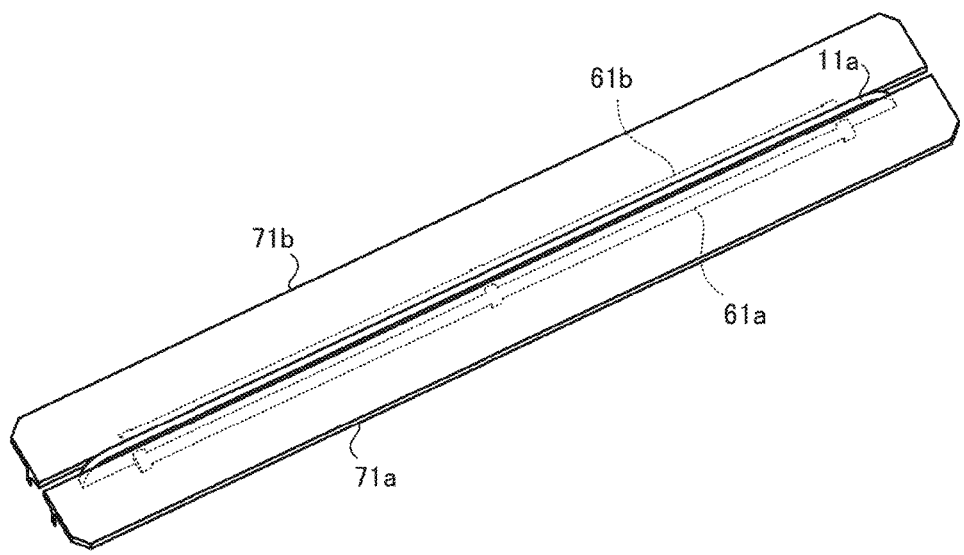
FIG. 8B is another perspective view from the lower position of the entire configuration of the electrically insulating members 71a and 71b, the entire configuration of the guide members 61a and 61b and the entire configuration of the electrode 11a, while the other configurations have been removed, in the second embodiment.

FIGS. 8A and 8B are perspective views from a lower position of an entire configuration of the electrically insulating members 71a and 71b, an entire configuration of the guide members 61a and 61b, and an entire configuration of the electrode 11a, while the other configurations have been removed, in the second embodiment. In FIG. 8A, the electrically insulating members 71a and 71b have been moved away from each other to show the guide members 61a and 61b and the electrode 11a. FIG. 8B shows that the electrically insulating members 71a and 71b overlap the lower surfaces of the guide members 61a and 61b as shown in FIGS. 6A and 6B.

A part of the electrode 11a may protrude downward from between the electrically insulating members 71a and 71b. According to the second embodiment, the electrically insulating members 71a and 71b overlap the lower surfaces of the guide members 61a and 61b and thus electric discharge in unintended spaces may further be suppressed.

4.3 Connecting Terminals

Figure 9:
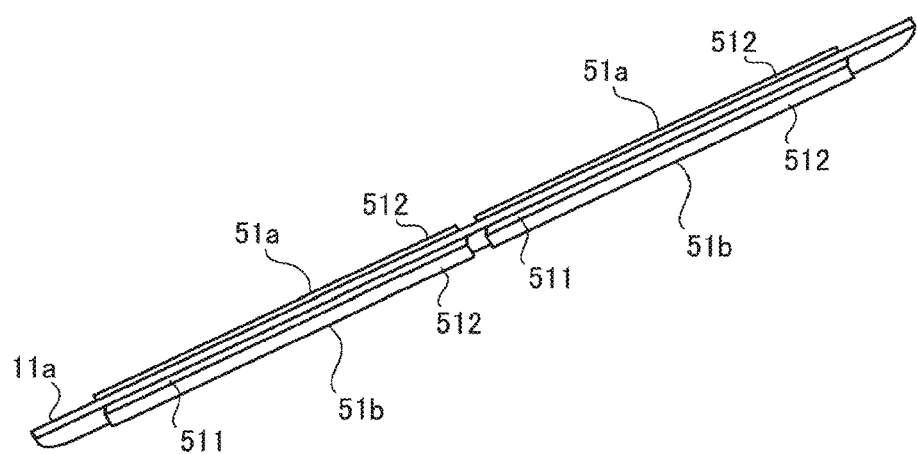
FIG. 9 is a perspective view from a higher position of an entire configuration of a plurality of connecting terminals 51a and 51b and an entire configuration of the electrode 11a, while the other configurations have been removed, in the second embodiment.

FIG. 9 is a perspective view from a higher position of an entire configuration of the connecting terminals 51a and 51b and an entire configuration of the electrode 11a, while the other configuration have been removed, in the second embodiment. As shown in FIG. 9, two connecting terminals 51a are arranged in the longitudinal direction of the electrode 11a on one side surface of the electrode 11a. Two other connecting terminals 51b are arranged in the longitudinal direction of the electrode 11a on the other side surface of the electrode 11a.

A plurality of bolts (not shown) may be used to anchor the first anchored portion 511 to the electrode 11a. The bolts may be arranged in the longitudinal direction of the electrode 11a. A plurality of bolts (not shown) may be used to anchor the second anchored portion 512 to the electrode holder 40. The bolts may be arranged in the longitudinal direction of the electrode 11a.

As described above, the connecting terminals 51a and 51b may flexibly support the electrode 11a in a direction opposite to the direction of gravity. The connecting terminals 51a are arranged in the longitudinal direction of the electrode 11a and the connecting terminals 51b are arranged in the longitudinal direction of the electrode 11a. Structure for supporting the electrode 11a in the direction opposite to the direction of gravity may thus avoid having uneven distribution in the longitudinal direction of the electrode 11a. Therefore, bending the electrode 11a by the gravity force may be suppressed.

4.4 Connecting Terminals (First Modified Example)

Figure 10:
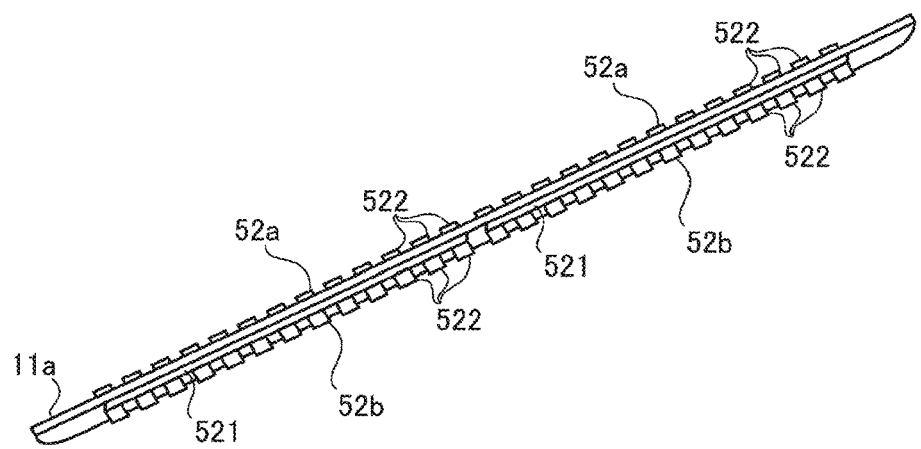
FIG. 10 is a perspective view from a higher position of an entire configuration of a plurality of connecting terminals 52a and 52b and an entire configuration of an electrode 11a, while the other configurations have been removed, in a first modified example of the second embodiment.

FIG. 10 is a perspective view from a higher position of an entire configuration of a plurality of connecting terminals 52a and 52b and an entire configuration of an electrode 11a, while the other configurations have been removed, in a first modified example of the second embodiment. As shown in FIG. 10, each of the connecting terminals 52a and 52b in the first modified example may have a plurality of second anchored portions 522. The second anchored portions 522 may be in a teethlike arrangement along the longitudinal direction of the electrode 11a.

In the first modified example, the second anchored portions 522 are in the teethlike arrangement. Reaction force generated when the electrode-gap-varying unit moves the electrode to bend the connecting terminals 52a and 52b may thus be reduced.

In other aspects, the first modified example may be substantially the same as the second embodiment described with reference to FIG. 9.

4.5 Connecting Terminal (Second Modified Example)

Figure 11A:
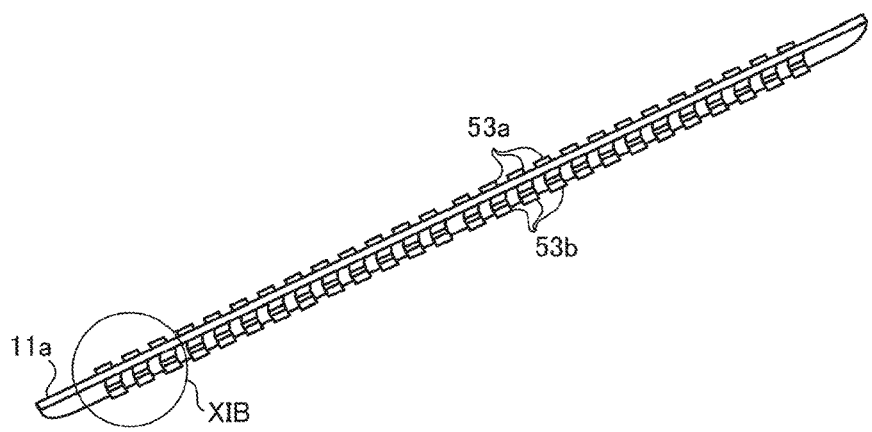
FIG. 11A is a perspective view from a higher position of an entire configuration of a plurality of connecting terminals 53a and 53b and an entire configuration of an electrode 11a, while the other configurations have been removed, in a second modified example of the second embodiment.

FIG. 11A is a perspective view from a higher position of an entire configuration of a plurality of connecting terminals 53a and 53b and an entire configuration of an electrode 11a, while the other configurations have been removed, in a second modified example of the coed embodiment. As shown in FIG. 11A, the second modified example may include multiple connecting terminals 53a arranged in the longitudinal direction of the electrode 11a on one side surface of the electrode 11a. The second modified example may include multiple connecting terminals 53b arranged in the longitudinal direction of the electrode 11a on the other side surface of the electrode 11a.

Figure 11B:
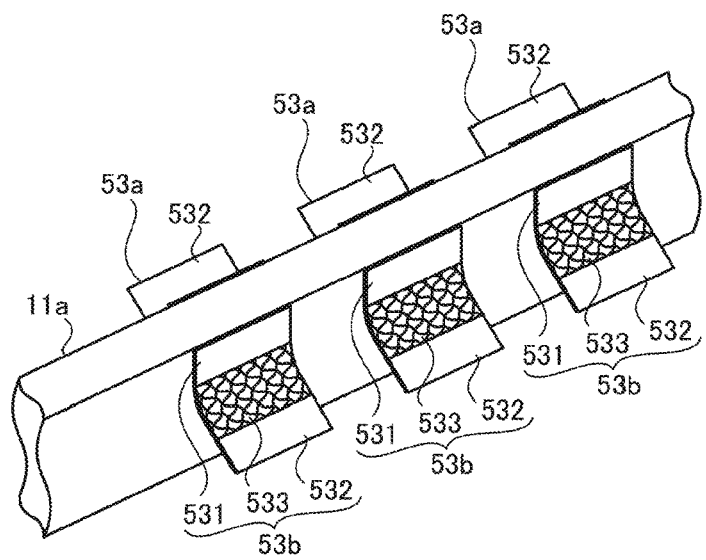
FIG. 11B is an enlarged perspective view of a portion in a circle XIB shown in FIG. 11A.

FIG. 11B is an enlarged perspective view of a portion in a circle XIB shown in FIG. 11A. As shown in FIG. 11B, each of the connecting terminals 53a and 53b may have a conducting member 533 including a mesh-shaped metal wire between a first anchored portion 531 anchored to the electrode 11a and a second anchored portion 532 anchored to the electrode holder 40.

In the second modified example, each of the connecting terminals 53a and 53b may have the conducting member 533 including the mesh-shaped metal wire. The conducting member 533 may absorb difference between thermal expansion of the electrode 11a and thermal expansion of the electrode holder 40 in the longitudinal direction of the electrode 11a. Therefore, bending the electrode 11a or breaking the connecting terminals 53a and 53b may be suppressed.

In other aspects, the second modified example may be substantially the same as the first modified example described with reference to FIG. 10.

Figure 12A:
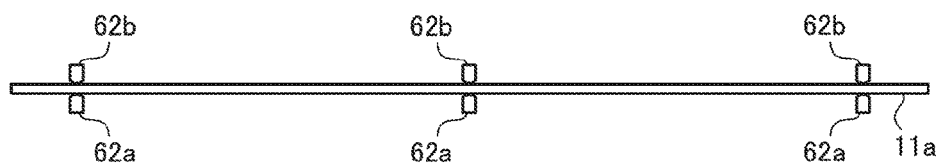
FIG. 12A shows an entire configuration of a plurality of guide members 62a and 62b and an entire configuration of an electrode 11a, while the other configurations have been removed, in a third embodiment.
Figure 12B:
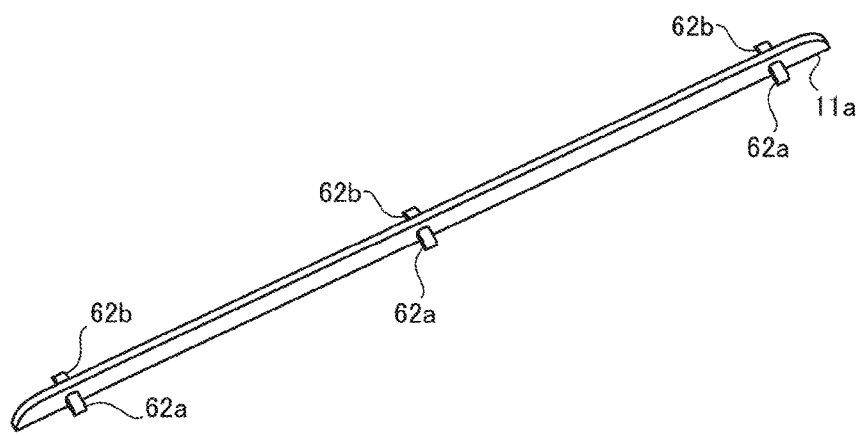
FIG. 12B shows an entire configuration of the guide members 62a and 62b and an entire configuration of the electrode 11a, while the other configurations have been removed, in a third embodiment.

5. Electrode Holding Structure where Function of Easing Electric Field is Omitted FIGS. 12A and 12B, show an entire configuration of a plurality of guide members 62a and 62b and an entire configuration of an electrode 11a, while the other configurations have been removed, according to a third embodiment. FIG. 12A is a view from a direction substantially parallel to a direction of electric discharge between the pair of electrodes. FIG. 12B is a perspective view from a lower position of the guide members 62a and 62b. Three guide members 62a may be arranged in the longitudinal direction of the electrode 11a on one side surface of the electrode 11a. Three other guide members 62b may be arranged in the longitudinal direction of the electrode 11a on the other side surface of the electrode 11a.

The guide members 62a and 62b in the third embodiment may correspond to the respective projecting portions 61c of the guide members 61a and 61b of the second embodiment described with reference to FIGS. 7A and 7B with the other portions being removed. The guide members 62a and 62b in the third embodiment may thus perform a function of guiding the electrode 11a in a direction substantially parallel to the direction of electric discharge, while the function of easing electric field may be weaker than in the second embodiment.

In other aspects, the third embodiment may be substantially the same as the second embodiment.

6. Electrode Holding Structure having Long Connecting Terminals

Figure 13:
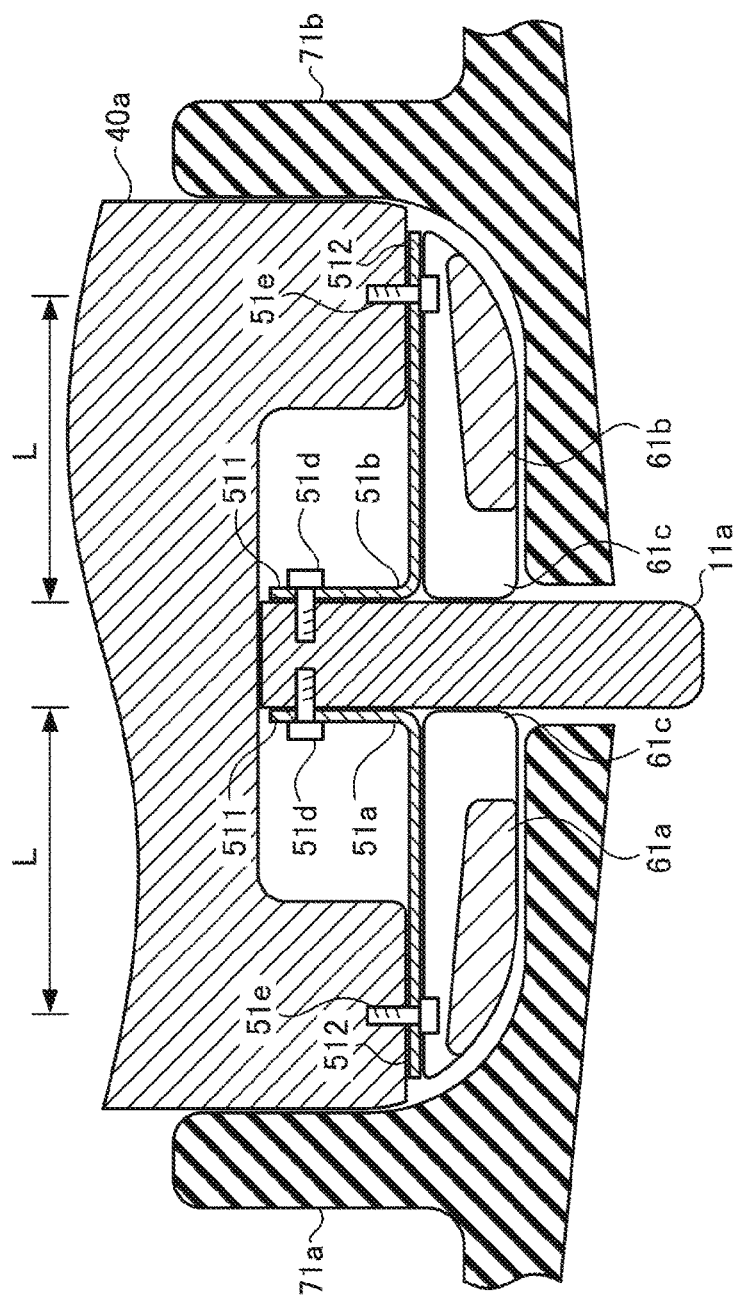
FIG. 13 is a cross-sectional view of an electrode holding structure in an excimer laser device according to a fourth embodiment.

FIG. 13 is a cross-sectional view of the electrode holding structure in an excimer laser device according to a fourth embodiment. An electrode holder 40a in the fourth embodiment may have a larger width than the electrode holder 40 in the second embodiment. Accordingly, each of connecting terminals 51a and 51b in the fourth embodiment ray have a length L that is larger than a length of each of the connecting terminals 51a and 51b in the second embodiment. Here, the length L of the connecting terminal 51a or 51b may be the length from an anchored portion of the connecting terminal by a bolt 51d to another anchored portion of the connecting terminal by a bolt 51e measured in a direction perpendicular to a side surface of the electrode 11a. In the fourth embodiment, the length L of the connecting terminal 51a or 51b may correspond to a distance between the side surface of the electrode 11a and the central axis of the bolt 51e.

As described with reference to FIG. 6B, moving downward the electrode 11a by the electrode-gap-varying units 31 and 32 may cause the connecting terminals 51a and 51b to deform. The connecting terminals 51a and 51b may upwardly support the electrode 11a by resilient force of the connecting terminals 51a and 51b. If the resilient force is too strong, the electrode 11a may bend.

If the connecting terminals 51a and 51b are considered simply as cantilevers, the resilient force is in inverse proportion to the cube of the length L of the connecting terminal 51a or 51b. In the fourth embodiment, each of the connecting terminals 51a and 51b may have a large length L to suppress the resilient force and suppress bending of the electrode 11a. The length L of each of the connecting terminals 51a and 51b may be, for example, 14 mm or more and 20 mm or less. Thee connecting terminals 51a and 51b may be made of, for example, brass, copper, an alloy of beryllium and copper, or phosphor bronze.

In other aspects, the forth embodiment may be substantially the same as the second embodiment described shove.

Figure 14:
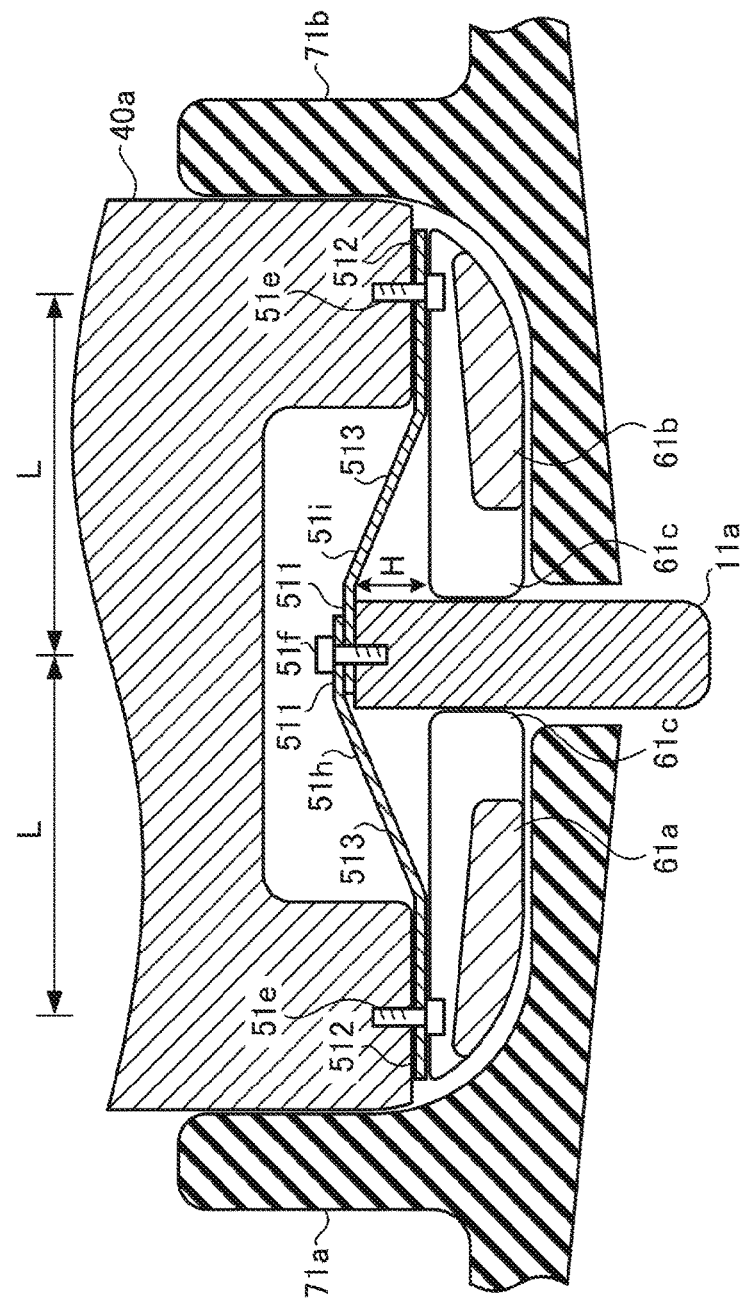
FIG. 14 is a cross-sectional view of an electrode holding structure in an excimer laser device according to a fifth embodiment.

7. Electrode Holding Structure with Connecting Terminals Attached to Upper Surface of Electrode FIG. 14 is a cross-sectional view of an electrode holding structure in an excimer laser device according to a fifth embodiment. In the fifth embodiment, a first anchored portion 511 of a connecting terminal 51i may be anchored to a top surface of the electrode 11a with a surface contact. A first anchored portion 511 of a connecting terminal 51h may be anchored to a top surface of the first anchored portion 511 of the connecting terminal 51i with a surface contact. These anchored portions 511 may be anchored by a bolt 51f.

A second anchored portion 512 of each of the connecting terminals 51h and 51i may be anchored to a bottom surface of the electrode holder 40a with a surface contact by a bolt 51e. Each of the connecting terminals 51h and 51i may not necessarily be in surface contact to a side surface of the electrode 11a.

In each of the connecting terminals 51h and 51i, the first anchored portion 511 may be located higher than the second anchored portion 512. The difference H in height between the first anchored portion 511 and the second anchored portion 512 may be equal to or less than the maximum stroke of the electrode 11a moved by the electrode-gap-varying units 31 and 32. A slope portion 513 may be formed between the first anchored portion 511 and the second anchored portion 512.

In the fifth embodiment, the length L of the connecting terminal 51h or 51i may correspond to the distance between the central cross section of the electrode 11a between the both side surfaces and the central axis of the bolt 51e.

In other aspects, the fifth embodiment may be substantially the same as the forth embodiment described above. If the length L of the connecting terminal in the fifth embodiment is equal to that in the fourth embodiment, the width of the electrode holder 40a in the fifth embodiment may be shorter than that in the fourth embodiment by the width of the electrode 11a.

8. Electrode with Function of Easing Electric Field

Figure 15A:
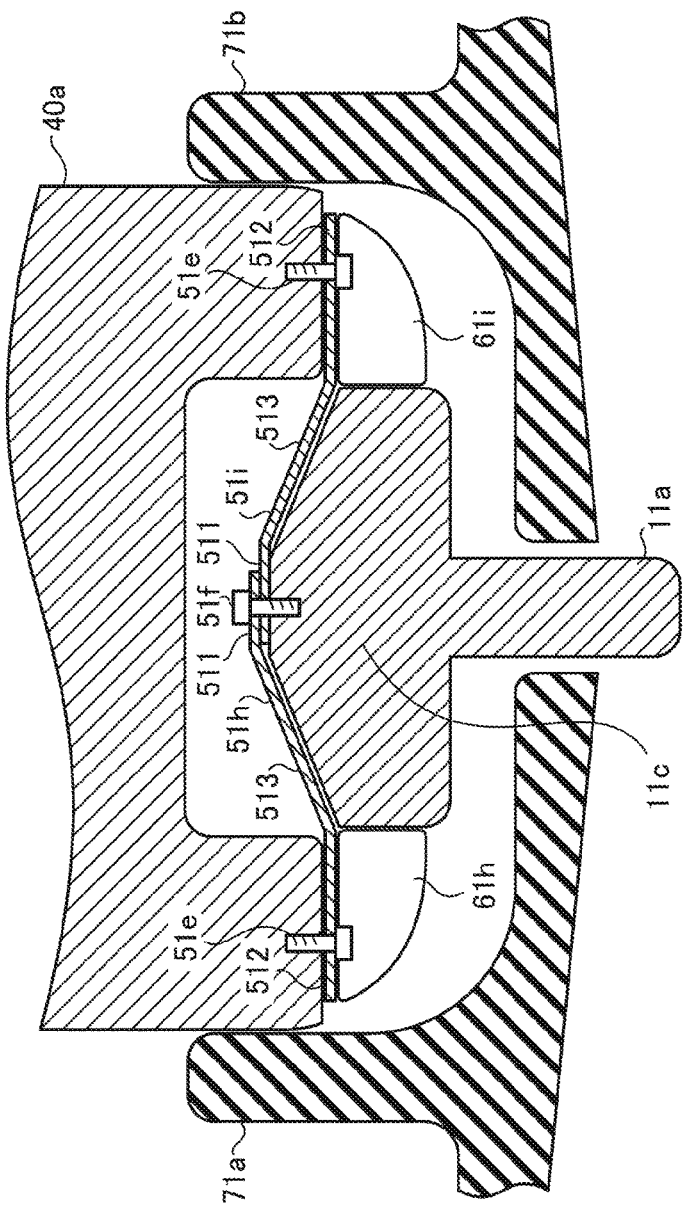
FIG. 15A is a cross-sectional view of an electrode holding structure in an excimer laser device according to a sixth embodiment.
Figure 15B:
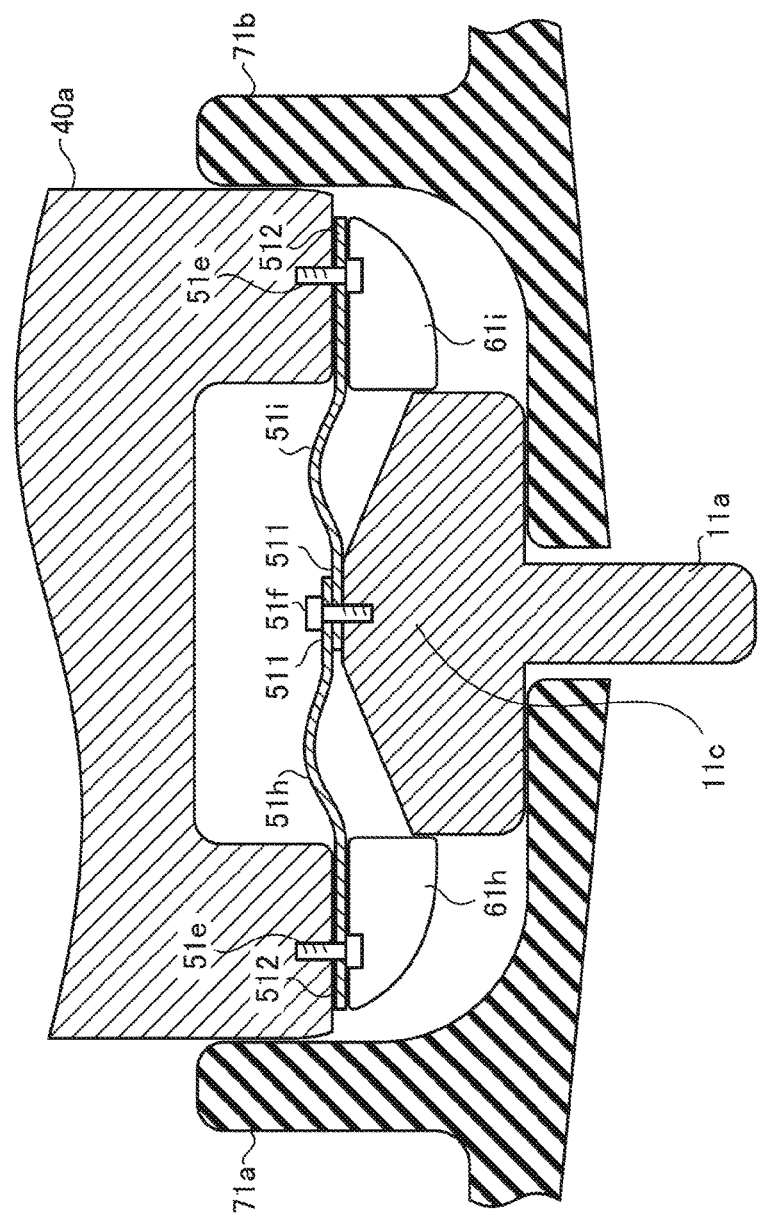
FIG. 15B is another cross-sectional view of the electrode holding structure in the excimer laser device according to the sixth embodiment.

FIGS. 15A and 15B are cross-sectional views of an electrode holding structure in an excimer laser device according to a sixth embodiment. FIG. 15A shows a situation before the electrode 11a is moved by the electrode-gap-varying unit. FIG. 15B shows a situation after the electrode 11a is moved by the maximum stroke by the electrode-gap-varying unit. As shown in FIGS. 15A and 15B, moving the electrode 11a by the electrode-gap-varying unit may result in deforming the connecting terminals 51h and 51i.

In the sixth embodiment, the electrode 11a may have a wide portion 11c in its upper half. The wide portion 11c may ease electric field in a space other than the discharge space between the electrodes 11a and 11b to suppress electric discharge in unintended spaces.

The guide members 61h and 61i may be located on the side surfaces of the wide portion 11c of the electrode 11a.

Figure 15C:
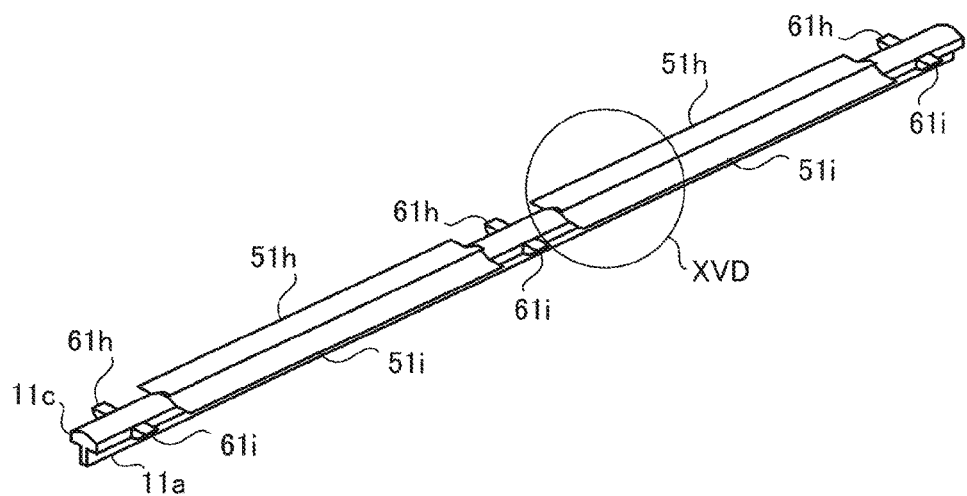
FIG. 15C is a perspective view from a higher position of an entire configuration of a plurality of connecting terminals 51h and 51i, an entire configuration of a plurality of guide members 61h and 61i, and an entire configuration of an electrode 11a, while the other configurations have been removed, in the sixth embodiment.

FIG. 15C is a perspective view from a higher position of an entire configuration of a plurality of connecting terminals 51h and 51i, an entire configuration of a plurality of guide members 61h and 61i, and an entire configuration of an electrode 11a, while the other configurations have been removed, in the sixth embodiment. In the sixth embodiment, three guide members 61h may be arranged in the longitudinal direction of the electrode 11a on one side surface of the wide portion 11c. Three other guide members 61i may be arranged in the longitudinal direction of the electrode 11a on the other side surface of the wide portion 11c. The guide members 61h and 61i may perform a function of guiding the electrode 11a in a direction substantially parallel to the direction of electric discharge.

Two connecting terminals 51h may be arranged in the longitudinal direction of the electrode 11a on the top surface of the electrode 11a. Two connecting terminals 51i may be arranged in the longitudinal direction of the electrode 11a on the top surface of the electrode 11a.

Figure 15D:
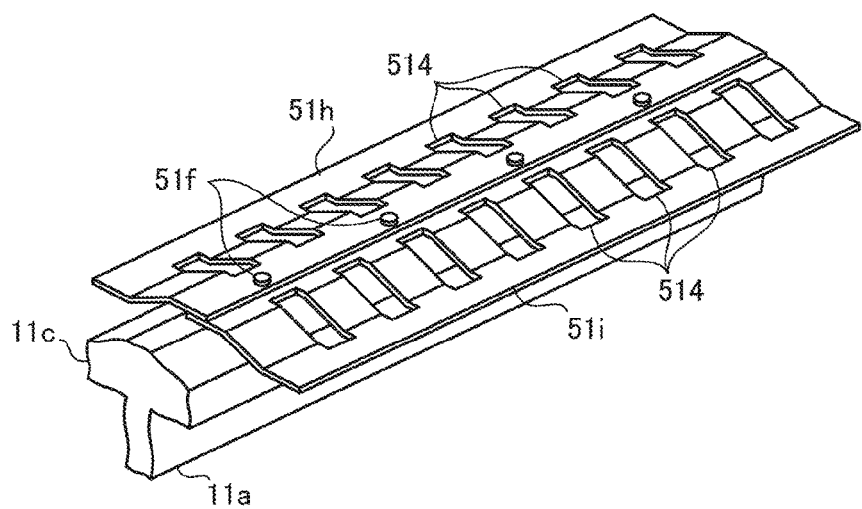
FIG. 15D is an enlarged perspective view of a portion in a circle XVD shown in FIG. 15C.

FIG. 15D is an enlarged perspective view of a portion in a circle XVD shown in FIG. 15C. A plurality of bolts 51f may be arranged in the longitudinal direction of the electrode 11a to anchor the first anchored portion 511 on the top surface of the electrode 11a.

Each of the connecting terminals 51h and 51i may have a plurality of apertures 514 arranged in the longitudinal direction of the electrode 11a. According to this, the resilient force generated by deforming the connecting terminals 51h and 51i may further be suppressed. If a sum of the lengths of apertures 514 is, for example, a half of the length of the connecting terminal 51h in the longitudinal direction of the electrode 11a, the resilient force of the connecting terminal 51h may be halved.

In other aspects, the sixth embodiment may be substantially the same as the fifth embodiment described above.

9. Electrode Holding Structure with Integrated Connecting Terminal

Figure 16:
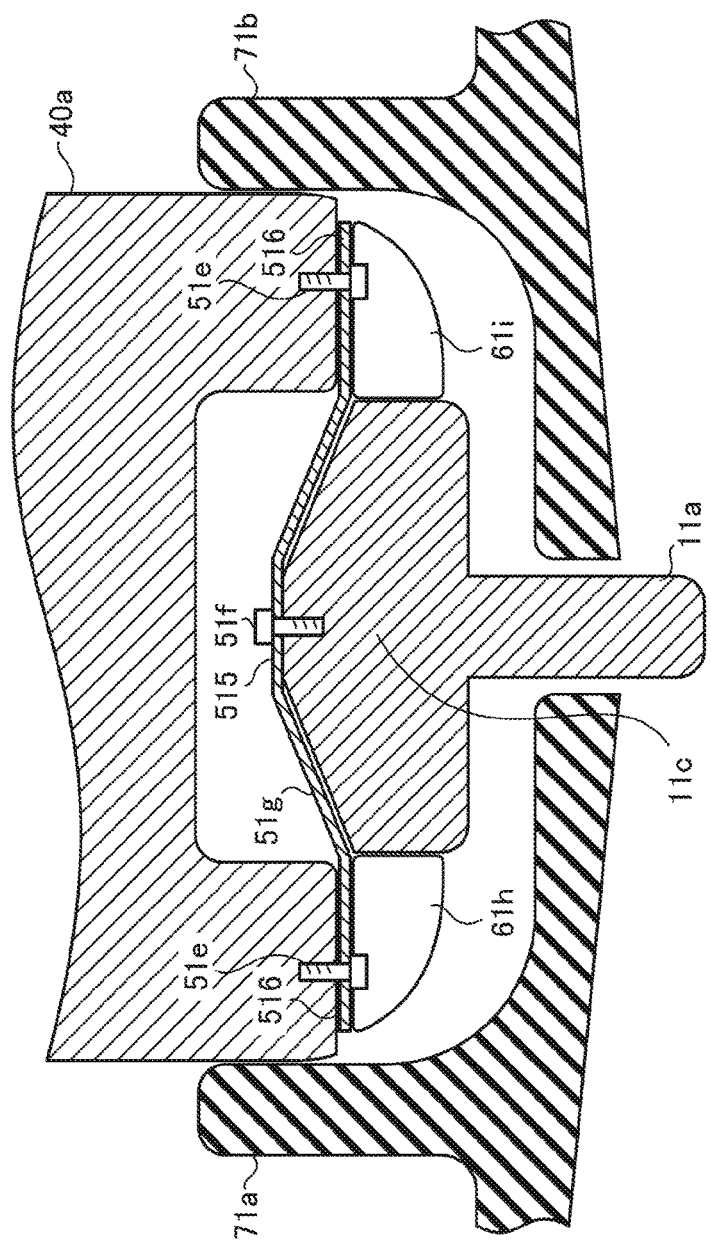
FIG. 16 is a cross-sectional view of an electrode holding structure in an excimer laser device according to a seventh embodiment.

FIG. 16 is a cross-sectional view of an electrode holding structure in an excimer laser device according to a seventh embodiment. The seventh embodiment includes a connecting terminal 51g. A central portion 515 of the connecting terminal 51g may be anchored to the top surface of the electrode 11a in surface contact. Both end portions 516 of the connecting terminal 51g may be anchored to the respective bottom surfaces of the electrode holder 40a in surface contact. The connecting terminal 51g in the seventh embodiment may correspond to an integrated structure of the connecting terminals 51h and 51i in the sixth embodiment.

In other aspects, the seventh embodiment may be substantially the same as the sixth embodiment.

10. Others (Configuration of Pulse Power Module)

Figure 17:
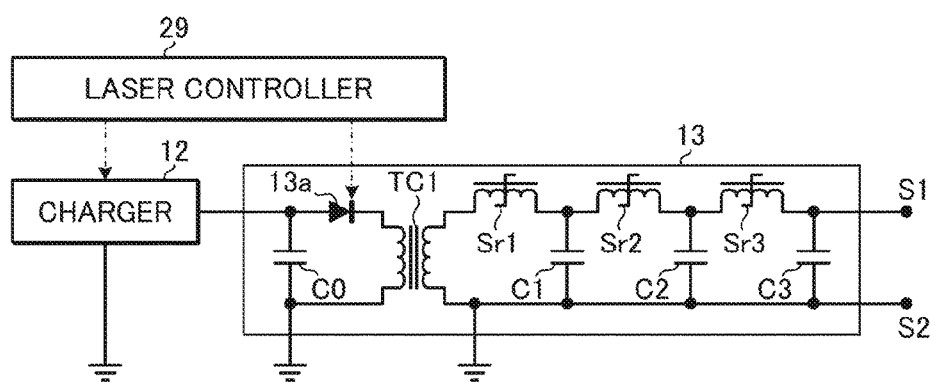
FIG. 17 is a circuit diagram showing a configuration of a pulse power module.

FIG. 17 is a circuit diagram showing a configuration of the pulse power module. The pulse power module 13 may include a charging capacitor C0, a switch 13a, a boosting transformer TC1 as a magnetic compression circuit, a plurality of magnetic switches Sr1 to Sr3, and a plurality of capacitors C1, C2 and C3. The both ends of the capacitor C3 may be connected to the respective connecting members S1 and S2 shown in FIGS. 2 and 3.

Each of the magnetic switches Sr1 to Sr3 may include a saturable reactor. Impedance of each of the magnetic switches Sr1 to Sr3 may become low when a time integrated value of voltages applied to both ends thereof reaches a value predetermined by the characteristics of each magnetic switch.

A charging voltage V(n) of the charger 12 may be set by the laser controller 29. The charger 12 may charge the charging capacitor C0 based on the charging voltage V(n) which has been set.

A switch signal from the laser controller 29 may be inputted to the switch 13a in the pulse power module 13. When the switch signal is inputted to the switch 13a, the switch 13a may turn ON. When the switch 13a turns ON, electric current may flow from the charging capacitor C0 through a primary side of the boosting transformer TC1.

The electric current flowing through a primary side of the boosting transformer TC1 may cause electric current to flow in the opposite direction through a secondary side of the boosting transformer TC1 due to electromagnetic induction. The electric current flowing through the secondary side of the boosting transformer TC1 may then cause the time integrated value of voltages applied to the magnetic switch Sr1 to reach a threshold value.

When the time integrated value of voltages applied to the magnetic switch Sr1 reaches the threshold value, the magnetic switch Sr1 may reach magnetic saturation to turn ON.

When the magnetic switch Sr1 turns ON, electric current may flow from the secondary side of the boosting transformer TC1 to the capacitor C1 to charge the capacitor C1.

Charging the capacitor C1 may cause the magnetic switch Sr2 to reach magnetic saturation and to turn ON.

When the magnetic switch Sr2 turns ON, electric current may flow from the capacitor C1 to the capacitor C2 to charge the capacitor C2. Here, a pulse width of the electric current to charge the capacitor C2 may be shorter than a pulse width of the electric current to charge the capacitor C1.

Charging the capacitor C2 may cause the magnetic switch Sr3 to reach magnetic saturation and to turn ON.

When the magnetic switch Sr3 turns ON, electric current may flow from the capacitor C2 to the capacitor C3 to charge the capacitor C3. Here, a pulse width of the electric current to charge the capacitor C3 may be shorter than the pulse width of the electric current to charge the capacitor C2.

The electric current may thus flow from the capacitor C1 to the capacitor C2 and then from the capacitor C2 to the capacitor C3, which may cause the pulse width of the electric current to be compressed and cause the voltage to be boosted.

When the voltage of the capacitor C3 reaches a breakdown voltage of the laser gas, insulation breakdown may occur in the laser gas between the pair of electrodes 11a and 11b. This may excite the laser gas to cause laser oscillation to generate a pulsed laser beam. Such a discharging operation may be repeated by the switching operation of the switch 13a to cause the pulsed laser beam to be outputted at a predetermined oscillation frequency.

The aforementioned descriptions are intended to be taken only as examples and are not to be seen as limiting in any way. Accordingly, it will be clear to those skilled in the art that variations on the embodiments of the present disclosure may be made without departing from the scope of the appended claims.

The terms used in the present specification and in the entirety of the scope of the appended claims are to be interpreted as not being limiting. For example, wording such as "includes" or "is included" should be interpreted as not being limited to the item that is described as being included. Furthermore, "has" should be interpreted as not being limited to the item that is described as being had. Furthermore, the modifier "a" or "an" as used in the present specification and the scope of the appended claims should be interpreted as meaning "at least one" or "one or more".

The invention claimed is:

1. An excimer laser chamber device comprising:
   a laser chamber having an opening;
   an electrical insulator configured to seal the opening;
   a first electrode provided in the laser chamber;
   a second electrode provided in the laser chamber to face the first electrode and to be connected to a ground potential;
   an electrode holder provided in the laser chamber to be connected to a high voltage via a conductive element penetrating the electrical insulator;
   at least one connecting terminal including a first anchored portion anchored to the first electrode and a second anchored portion anchored to the electrode holder, the at least one connecting terminal being configured to electrically connect the first electrode and the electrode holder;
   a guide member held by the electrode holder, the guide member being configured to position the first electrode in a direction substantially perpendicular to both a direction of electric discharge between the first electrode and the second electrode and a longitudinal direction of the first electrode; and
   an electrode-gap-varying unit penetrating the electrical insulator and configured to move the first electrode in a direction substantially parallel to the direction of electric discharge.

2. The excimer laser chamber device according to claim 1, wherein
   the first electrode is located in a position distanced from a position of the second electrode in a direction substantially parallel to a direction of gravity, and
   the at least one connecting terminal is configured to flexibly support the first electrode in a direction opposite to the direction of gravity.

3. The excimer laser chamber device according to claim 1, wherein the at least one connecting terminal includes a metal plate.

4. The excimer laser chamber device according to claim 3, wherein the metal plate includes copper or nickel.

5. The excimer laser chamber device according to claim 1, wherein the at least one connecting terminal includes a mesh-shaped metal wire.

6. The excimer laser chamber device according to claim 1, wherein
   the first anchored portion is anchored to a side surface of the first electrode in surface contact, and
   the second anchored portion is anchored to the electrode holder in surface contact.

7. The excimer laser chamber device according to claim 1, wherein the guide member positions the first electrode by contacting the first electrode on at least three locations in the side surface of the first electrode.

8. The excimer laser chamber device according to claim 7, wherein the guide member includes copper or nickel.

9. The excimer laser chamber device according to claim 1, wherein the guide member positions the first electrode by sandwiching the first electrode from both side surfaces of the first electrode at a plurality of locations arranged in the longitudinal direction of the first electrode.

10. The excimer laser chamber device according to claim 1, wherein
    the guide member has electrical conductivity, and
    the guide member has a form to ease electric field in a space other than a discharge space between the first electrode and the second electrode.

11. The excimer laser chamber device according to claim 10, further comprising
    an electrically insulating member overlapping a lower surface of the guide member.

12. The excimer laser chamber device according to claim 1, wherein the at least one connecting terminal includes a plurality of connecting terminals arranged in the longitudinal direction of the first electrode.

13. The excimer laser chamber device according to claim 1, wherein the first anchored portion is anchored to a top surface of the first electrode, and the second anchored portion is anchored to the electrode holder.

14. The excimer laser chamber device according to claim 13, wherein the at least one connecting terminal includes a slope portion between the first anchored portion and the second anchored portion.

15. The excimer laser chamber device according to claim 14, wherein the first anchored portion is located higher than the second anchored portion.

16. The excimer laser chamber device according to claim 15, wherein difference in height between the first anchored portion and the second anchored portion is equal to or less than a stroke of the first electrode moved by the electrode-gap-varying unit.

17. The excimer laser chamber device according to claim 13, wherein the at least one connecting terminal includes two second anchored portions, and the first anchored portion is located between the two second anchored portions.

18. The excimer laser chamber device according to claim 1, wherein the at least one connecting terminal includes at least one of brass, copper, an alloy of beryllium and copper, and phosphor bronze.

19. The excimer laser chamber device according to claim 1, wherein the at least one connecting terminal has a plurality of apertures.

20. The excimer laser chamber device according to claim 1, wherein an upper portion of the first electrode has a width that is larger than a width of a lower portion of the first electrode.

* * * * *